United States Patent
Lenz et al.

(10) Patent No.: US 11,403,148 B2
(45) Date of Patent: Aug. 2, 2022

(54) VIRTUAL ELECTRONIC CONTROL UNITS IN AUTOSAR

(71) Applicant: APTIV TECHNOLOGIES LIMITED, St. Michael (BB)

(72) Inventors: Arne Lenz, Windeck (DE); Andreas Schäfer, Witten (DE); Sven Hänsel, Frankfurt am Main (DE); Max Neusser, Kronberg (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 97 days.

(21) Appl. No.: 16/713,077

(22) Filed: Dec. 13, 2019

(65) Prior Publication Data

US 2020/0192722 A1 Jun. 18, 2020

(30) Foreign Application Priority Data

Dec. 18, 2018 (EP) .................................. 18213599

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45575* (2013.01); *G06F 2009/45587* (2013.01)

(58) Field of Classification Search
CPC .................................................. G06F 9/5077
See application file for complete search history.

(56) References Cited

U.S. PATENT DOCUMENTS

| | | | |
|---|---|---|---|
| 2010/0292867 A1* | 11/2010 | Bohm | G06F 9/45533 701/1 |
| 2015/0254017 A1* | 9/2015 | Soja | G06F 3/0622 711/103 |
| 2018/0060142 A1 | 3/2018 | Skeffington et al. | |
| 2018/0189103 A1* | 7/2018 | Teshler | H04L 67/42 |
| 2020/0104492 A1* | 4/2020 | Boulton | G06F 21/562 |
| 2020/0233702 A1* | 7/2020 | Okabe | G06F 9/4837 |

FOREIGN PATENT DOCUMENTS

EP 3 099 019 A1 11/2016

OTHER PUBLICATIONS

Alexander Zuepke; Autobest: A United Autosar-OS and ARINC 653 Kernel; 2016 (Year: 2016).*

(Continued)

*Primary Examiner* — Dong U Kim
(74) *Attorney, Agent, or Firm* — Carlson, Gaskey & Olds, P.C.

(57) ABSTRACT

An electronic control unit includes a plurality of cores. The electronic control unit hosts, by virtualization, a plurality of partitions including a first and a second partition. Each of the partitions is assigned to at least one of the cores. The first partition is implemented to run, on its at least one core, an AUTOSAR architecture platform instance providing AUTOSAR basic software services. The second partition is implemented to run, on its at least one core, AUTOSAR software components. A partition interface couples the first and second partitions such that the AUTOSAR software components are run as part of said AUTOSAR architecture platform instance implemented in the first partition.

15 Claims, 2 Drawing Sheets

(56) References Cited

OTHER PUBLICATIONS

Wenhao Wang; Optimizing Application Distribution on Multi-Core Systems within Autosar; 2016 (Year: 2016).*
Nagarjuna Rao Kandimala; Safety and Security Features in Autosar; Nov. 15, 2012; (Year: 2012).*
Autosar: "Requirements on Operating System (Autosar Classic Standard Platform Release 4.4.0)" Oct. 31, 2018 Retrieved from the Internet: www.autosar.org/standards/classic-platform/classic-platform-440/.
Extended European Search Report for Application No. EP 18 21 3599 dated Jun. 3, 2019.

* cited by examiner

VIRTUAL ELECTRONIC CONTROL UNITS IN AUTOSAR

CROSS REFERENCE TO RELATED APPLICATIONS

This application claims priority to European Patent Application No. 18213599.6, filed on Dec. 18, 2018.

The present invention relates to an electronic control unit (ECU) comprising a plurality of cores.

BACKGROUND

The AUTomotive Open System ARchitecture, or AUTOSAR, standardizes the electronics and software architectures used in modern cars, with the aim of simplifying the development and integration of vehicle related software functions.

Modern cars are now capable of supporting many sophisticated functions, including self-navigation and maneuvering, advanced engine emission control, image detection based services and complex control algorithms for improving car dynamics.

Accordingly, the number of electronic control units (ECU) embedded in vehicles is steadily increasing and can today reach more than 100 ECUs for a single car.

In view of this development, modern electronic control units (ECU) are being equipped with a plurality of cores for enhancing the computational power and provided software function capabilities.

However, the original AUTOSAR standard defines system services which are generally assigned to software architectures having single core characteristics.

It follows that the AUTOSAR standard often fails to utilize the benefits of parallelizing the execution of applications on a plurality of electronic control unit (ECU) cores.

The AUTOSAR 4.0 standard specifies a multicore support by defining that all cores should operate on the same (shared) code base for reducing the footprint of the operating system (OS) in the memory. Thus, the same code base is used for all cores, implying that only one core can execute the basic software (BSW) of the AUTOSAR software architecture a time, wherein the only part executed by all cores is the operating system (OS), having separate data structures for each core.

The AUTOSAR standard further proposes that an Inter OS-Application Communicator (IOC) should be used in connection with the runtime environment (RTE) of the software architecture to map communication across cores and memory partition boundaries. However, as the Inter OS-Application Communicator (IOC) operates using a sender-receiver protocol, for example by implementing data memory buffers, the proper scheduling and corresponding execution of time critical data transmissions represents a challenging task, in particular when attempting to implement a high degree of parallelism running a plurality of cores.

Virtualization techniques have been used to consolidate the multiple AUTOSAR ECU configurations, for example to integrate multiple single core AUTOSAR ECUs in a single platform by isolating the operation of each of the conventional single (or low number) core ECU configurations.

In this way, a system can host several partitions, where each partition acts as an independent virtual machine (VM) and each virtual machine (VM) can run an individual operating system (OS), e.g. for running a single core.

Accordingly, for example, a plurality of conventional single core electronic control unit (ECU) configurations can be implemented in a single electronic control unit (ECU). In this way, a plurality of cores can be employed without requiring significant re-validation and testing efforts when merging the single core based software structures.

However, such a concept of virtual parallelization requires that the hypervisor used for the virtualization process must abstract the hardware platform and must run multiple operating systems (OS) in parallel to allow access to all hardware services from all cores.

Moreover, running the parallel operating systems (OS) in the context of individual parallel AUTOSAR stacks leads to big overhead in ROM and RAM consumption, complicates the time-, handshake- and memory-handling of parallel running drivers and applications, such as for example Ethernet drivers.

Consequently, the handling of communication between software running in parallel on different partitions becomes difficult, and can require complicated shared resources and services handling for ensuring safe and reliable operation of the overall system.

SUMMARY

In view of the above, embodiments of the present invention improve the implementation of AUTOSAR related services when using an electronic control unit (ECU) comprising a plurality of cores and in particular to reduce a test effort for the implementation of new functions.

In accordance with an aspect of the present invention, an electronic control unit (ECU) includes a plurality of cores, wherein:
  the electronic control unit (ECU) hosts, preferably by virtualization, a plurality of partitions including a first and a second partition,
  it is preferred that each of the partitions is assigned to at least one of said cores,
  the first partition is implemented to run, on its at least one core, an AUTOSAR architecture platform instance providing AUTOSAR basic software (BSW) services (i.e. an AUTOSAR architecture platform instance), and
  the second partition is implemented to run, on its at least one core, AUTOSAR software components (SWC), wherein a partition interface couples the first and second partitions such that the AUTOSAR software components (SWC) are run as part of said AUTOSAR architecture platform instance implemented in the first partition.

Hence, a virtualization technique is applied to have the electronic control unit (ECU) host a plurality of partitions for running a plurality of cores. The ECU may thus comprise a CPU (central processing unit) that comprises several individual processors, i.e. cores.

Each of the first and second partitions is assigned to at least one of the cores. Thus, each partition is provided with the computational resources of a single core or multiple cores. However, it is preferred that a core is not shared by multiple partitions, i.e. that every core is assigned to only one of said partitions, because a different arrangement could result in undesired runtime dependencies deteriorating the independency of each of the partitions.

It is to be noted that more than one partition running AUTOSAR software components (SWC) can be used in parallel (e.g. the second and third partition as mentioned herein). The invention provides more advantages, the more partitions running AUTOSAR software components (SWC)

are used, wherein at the same time only one first partition providing AUTOSAR basic software (BSW) services is necessary. In other words, only one partition comprising BSW services can be combined with n partitions running SWC, yielding n+1 partitions in total. The ECU as disclosed herein can therefore act as a multi-domain-controller and can thus combine the functionality of different conventional control units, e.g. in a single housing and/or within a single ECU. For example, one partition providing AUTOSAR basic software (BSW) services could be combined with several, particularly with 2, 3, 4, 6, 8, 10 or 12, partitions running AUTOSAR software components (SWC). The partitions as mentioned herein could also be termed "Smart-VIPs" ("Virtual Partitions").

The first partition is implemented to run an AUTOSAR architecture platform instance. More specifically, the virtualization technique is applied to deploy a virtual machine acting on the first partition as an AUTOSAR software instance providing AUTOSAR basic software (BSW) services.

According to the AUTOSAR standard, the respective basic software (BSW) services may include more than 40 defined modules, and thus can constitute the largest part of the AUTOSAR system. The basic software (BSW) provides services needed by (other) software components (SWC) in order to fulfill their functions, such as for example software components (SWC) implemented to provide vehicle self-navigation and maneuvering, advanced engine emission control, image detection based services or complex control algorithms for improving car dynamics.

According to the AUTOSAR standard, the basic software (BSW) is structured in layers, for example in: the Service Layer providing fundamental services including the operating system (OS) to the software components (SWC) and other basic software (BSW) modules; the electronic control unit (ECU) Abstraction Layer abstracting for easier access services provided by hardware of the electronic control unit (ECU); the Microcontroller Abstraction Layer abstracting the concrete microcontroller architecture for improved transparency; and the Complex Drivers Layer providing additional functionalities and drivers which may not otherwise be compliant with AUTOSAR, including for example legacy drivers enabling hardware connections.

In other words, AUTOSAR software components (SWC) are, among others, formally defined software components with specified partition interfaces to the basic software (BSW). The basic software in turn may provide fundamental standard services, such as bus communication (e.g. CAN, Ethernet or Flexray), memory management, IO (Input/Output)-access, system and diagnostic services.

Conventionally, virtualization techniques are applied to consolidate multiple AUTOSAR ECU configurations on a single platform, wherein each of the several hosted partitions acts as an independent virtual machine (VM), running a different instance of AUTOSAR basic software (BSW) modules. In particular, each instance of AUTOSAR basic software (BSW) modules is conventionally configured with its own resources (cores, memory, I/O, etc.) managed by individual hypervisors.

As explained above, such an arrangement of independent AUTOSAR partition stacks can lead to big overhead in ROM and RAM consumption, complicate the time-, handshake- and memory-handling of parallel running drivers and applications, and complicate the handing and diagnostics of communication between software running in parallel in the different partitions.

In view of this, according to an embodiment of the present invention, the first partition is implemented to run an AUTOSAR architecture platform instance, whereas software of the second partition is implemented to run as part of the AUTOSAR architecture platform instance provided by the first partition. Preferably, the first partition is implemented to only run an AUTOSAR architecture platform instance, whereas software of the second partition (or the third partition) is implemented to only run as part of the AUTOSAR architecture platform instance provided by the first partition. Thus, rather than duplicating the AUTOSAR architecture platform instance for the second partition, the second partition is defined to include AUTOSAR software components (SWC), wherein a partition interface couples the first and second partitions.

In this way, the AUTOSAR software components (SWC) running on at least one core of the second partition can be adapted to use AUTOSAR basic software (BSW) services provided by said AUTOSAR architecture platform instance implemented in the first partition.

It follows according to an embodiment of the present invention that an AUTOSAR stack is implemented in only one of the partitions, but is used by AUTOSAR software of only partitions that are running AUTOSAR software components (SWC) or is used e.g. by the first and second partitions. It follows that the need for running in parallel the conventional plurality of AUTOSAR architecture platform instances implemented in the different partitions is circumvented, reducing the complexity and requirement demands of the corresponding memory management, handshake algorithms and inter-partition communication techniques.

In an example, the plurality of partitions hosted by the electronic control unit (ECU) includes a third partition which is implemented to run, on its at least one core, further AUTOSAR software components (SWC). Moreover, a partition interface is provided to couple the first and third partitions such that the AUTOSAR software components (SWC) of the third partition are run as part of said AUTOSAR architecture platform instance implemented in the first partition.

In other words, the AUTOSAR stack is implemented in the first partition, but is used by AUTOSAR software of the first, second and third partitions. Thus, also in this case, the need for running in parallel the conventional plurality of AUTOSAR architecture platform instances implemented in the different partitions is circumvented, reducing the complexity and requirements of the corresponding memory management, handshake algorithms and inter-partition communication techniques.

In an example embodiment, the first partition only comprises AUTOSAR basic software (BSW) services and no (further) AUTOSAR software components (SWC). Correspondingly, the second and/or third partition and/or any further partition can only comprise AUTOSAR software components (SWC) and no AUTOSAR basic software (BSW) services. The AUTOSAR stack that is implemented in the first partition can then be used by AUTOSAR software of the second and/or third partitions (and in any further partition).

The first partition can be adapted to act as a data interface for the second and/or third partition (and any further partition). For example, only the first partition can use or provide a CAN-Bus stack or a CAN-Bus channel. This means that data transferred from or to the second and/or third partition is routed through the first partition. No direct communication may be allowed between the second and third partition.

It is noted that implementing separate AUTOSAR software components (SWC) in the second and third partitions allows a clear and reliable separation of implemented software functions, improves the software architectural transparency and simplifies the overall software development process. Particularly, a reliable safeguard against interference between partitions can be guaranteed by a lean hypervisor, wherein the lean hypervisor performs a secure startup of the different partitions. The lean hypervisor can comprise a memory protection unit (MPU) that surveils data access.

Moreover, the AUTOSAR software components (SWC) of the second partition and the AUTOSAR software components (SWC) of the third partition can be implemented by separately memory flashing the respective partitions.

In an example embodiment, for this purpose, the flash memory addresses and address ranges of the first, second and third partitions are fixed prior to flashing, and further preferred remain fixed between flashing operations. In this way, the partitions can be separately flashed, allowing individual software development for each of the partitions, simplifying partition based memory comparisons, and allowing easier debugging/updating of software applications provided by each individual partition.

In an example embodiment, the partition interface coupling the first and second partitions is implemented as a proxy software component (SWC) of the AUTOSAR architecture platform instance (i.e. in the first partition). In this way, the communication channel is restricted to AUTOSAR inherent proxy software components (SWC) providing enhanced runtime performance and testability within the AUTOSAR environment.

Conventionally, AUTOSAR proposes that an Inter OS-Application Communicator (IOC) should be used for communicating between software components (SWC) linked to different operating systems (OS), or linked to the same or different cores. In this respect, the Inter OS-Application Communicator (IOC) operates using a sender-receiver protocol which is conducted via data memory buffers.

In an embodiment, the IOC can be used to facilitate communication between the first and second as well as between the first and third partition. In contrast to the conventional IOC, the IOC can be used to transfer packages of data that comprise a plurality of signals, e.g. measurement signals (instead of transferring the signals themselves). Depending on the time constraints, these packages of data can comprise signals of predefined time duration, e.g. 5 ms, 10 ms or 20 ms.

Furthermore, a data communication between the different partitions can be performed on task level and not on interrupt level. This means that a transfer of data can be initiated by a task (e.g. of the second or third partition).

Additionally, data areas for exchanging data between a bootloader and the partitions may be provided.

Moreover, the partition interfaces coupling the first and third partitions can be implemented as a proxy software component (SWC) of the AUTOSAR architecture platform instance.

In an example embodiment, an AUTOSAR software component (SWC) of the second partition is adapted to communicate with an AUTOSAR software component (SWC) of the third partition by using the partition interfaces coupling the first and second partitions, and the first and third partitions, respectively.

In this way, the communication between AUTOSAR software components (SWC) of the different partitions is conveyed via the first partition hosting the operating system (OS), allowing a centralized approach for improved synchronization, time scheduling and overall monitoring of data transmission within the multi core system.

This is particularly useful for collecting and distributing signals in a coordinated manner by the operating system (OS) of the first partition, wherein the signals are generated and received by AUTOSAR software components (SWC) belonging to other and different partitions of the electronic control unit (ECU).

In an example embodiment, the first partition is adapted to convey all communication between AUTOSAR software components (SWC) belonging to different partitions of the electronic control unit (ECU). This further enhances the benefits of having the first partition perform the respective synchronization, time scheduling and/or monitoring of the inter-partition data transmissions, in a centralized manner within the multi core system.

In an example, the operating system (OS) implemented in the first partition is configured to schedule and/or time monitor an AUTOSAR software component (SWC) running on cores of the second and/or third partition.

In this way, the execution of distributed software applications and the corresponding coordination of processing data and data sharing can be handled in an efficient and centralized manner by the operating system (OS) of the first partition, for example by a task manager implemented in the first partition. This is particularly useful when a high degree of parallelism is being implemented in the system, for example wherein the first, second and/or third partitions are each assigned to at least two cores.

For this purpose, the operating system (OS) may be implemented in the first partition is provided with fixed start addresses of AUTOSAR software components (SWC) running on cores of the second or third partition, such as to allow the operating system (OS) to schedule and initiate the execution of the respective AUTOSAR software components (SWC). The fixed start addresses are needed to have binary compatible partitions, e.g. if the functionality of a partition is not changed, when an update is performed. The fixed start addresses can be previously defined addresses and/or can be provided via jump tables or similar measures.

It is further preferred that the first partition acts as an external interface for all partitions running in the electronic control unit to external devices. Thus, all data communication from e.g. the second and/or third partition to external devices is routed through the first partition and/or is facilitated by the BSW of the first partition.

As an alternative, it is possible that at least some communication between AUTOSAR software components (SWC) belonging to different partitions of the electronic control unit (ECU) is performed directly between the respective partitions. Then, the respective partitions can comprise a distributed communication stack (COM-Stack).

The invention further relates to a vehicle, e.g. an autonomously driving car, comprising the electronic control unit, as disclosed herein.

An illustrative example method of executing AUTOSAR software components includes
    a plurality of partitions including a first and a second partition are hosted by virtualization,
    each of the partitions is assigned to at least one of the cores of an ECU,
    the first partition is implemented to run, preferably on its at least one core, an AUTOSAR architecture platform instance providing AUTOSAR basic software (BSW) services (i.e. an AUTOSAR architecture platform instance), and the second partition is implemented to run, preferably on its at least one core, AUTOSAR software components (SWC), wherein the first and second partitions are coupled such that the AUTOSAR software components (SWC) are run as part of said AUTOSAR architecture platform instance implemented in the first partition.

Testing of changed/amended software portions, particularly of the second and third partition, is facilitated.

For example, the first partition can provide the BSW services, whereas the second partition can provide SWCs that are used for standard automotive functions like ABS (Anti-lock braking system) or the control of lighting functions. The software in the second partition may be well tested and does not require further development. The third partition, in contrast, may provide SWC/software that allows an autonomous driving of the vehicle. The software of the third partition may therefore be updated, changed or amended quite frequently.

In case, for example, when only the software of the third partition has been changed, preferably without changes in an external or partition interface, it may only be necessary to fully test the new software of the third partition. Testing of the first and second partition may then not be required. In this case, a binary comparison of the software of the first and/or second partition can be performed. This binary comparison can then indicate that the software of the first and/or second partition is unchanged and can therefore be expected to operate as usual.

In general, the method can therefore comprise
changing only one software of the second and/or third partition, wherein all external or partition interfaces remain unchanged,
performing, preferably only, a binary comparison of the software of the unchanged partition(s) in order to verify that the unchanged partition(s) is/are actually unchanged.

Apart from the binary comparison (to a version of the partition before changing another partition), only the changed partition may be tested (i.e. an interface timing test of the first partition or a test of the second or third partition may be performed).

Alternatively, it is possible that an external and/or partition interface is changed. Optionally one (or only one) of the second or third partition is changed, In this case, the timing of the changed interface can be tested and a binary comparison of the unchanged partition(s) can be performed. The timing test may comprise a static and/or dynamic test of the interfaces in order to guarantee that each partition will provide the required functionality. Further tests may preferably not be performed to reduce test effort.

When performing an interface timing test, particularly a worst case latency measurement can be executed. In general the tests of the interfaces and/or the partitions can be performed in a software-in-the-loop (SIL) or even in a hardware-in-the-loop (HIL) environment and/or can be performed automatically.

In an embodiment, it can be determined that one of the second or third partition is not compatible with the first partition. In this case, the incompatible partition may then be deactivated, e.g. by means of coding parameters of the control unit. Alternatively, a functional degradation can be performed that allows the incompatible partitions to cooperate on a functionally reduced basis.

The further advantages and embodiments disclosed herein with respect to the inventive control unit also apply to the inventive vehicle and the inventive method (and vice versa).

Further embodiments of the present invention are described in the following description of Figures. The present invention will be explained in the following by means of embodiments and with reference to drawings in which is shown:

DESCRIPTION OF THE EMBODIMENTS

In the following, any statement made having regard to the direction of a component are made relative to the position shown in the drawing and can naturally vary in the actual position of application.

Figure 1:
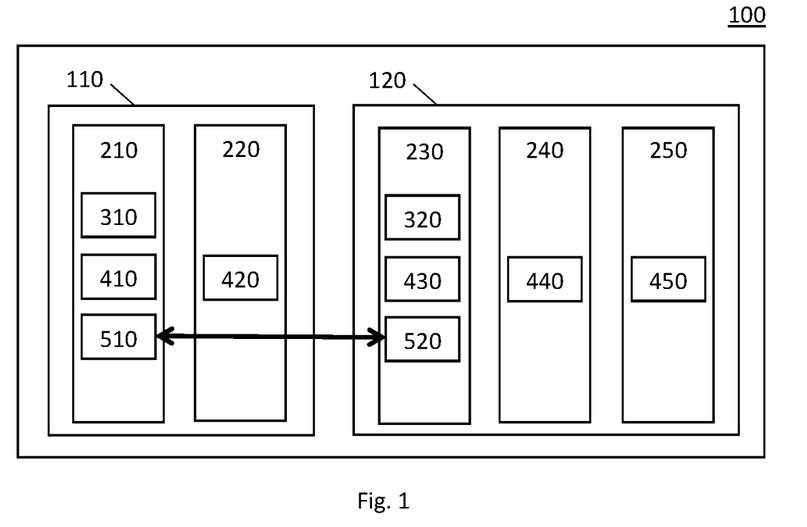
FIG. 1 Prior-art virtualization concept for multi-core systems,
FIG. 2 virtualization concept according to the present invention,
FIG. 3 three partitions deployed by the virtualization concept, and
FIG. 4 centralized communication in a multi partition system.

FIG. 1 shows a prior-art virtualization concept applied to an electronic control unit 100, wherein the electronic control unit 100 includes a plurality of cores 210-250.

In this example, the virtualization concept has been used to consolidate two individual AUTOSAR ECU configurations in a single platform.

More specifically, the system hosts two different partitions 110, 120 wherein each partition 110, 120 acts as an independent virtual machine (VM). The first partition 110 is assigned to two cores 210, 220 and the second partition 120 is assigned to the remaining three cores 230, 240, 250 of the underlying electronic control unit 100.

Each virtual machine (VM) runs basic software 310, 320 which is structured in layers. In this example, each of the basic software 310, 320 provides fundamental services, including the services of an individual operating system (OS), to software components 410-450 and other basic software 320, 320 of each AUTOSAR ECU configuration, respectively.

It follows that a plurality of conventional AUTOSAR ECU configurations can be implemented in a single electronic control unit (ECU) such as to utilize the plurality of cores 210-250.

However, as mentioned above, such a concept of virtual parallelization requires that the hypervisors used for the virtualization process must abstract the hardware platform and run multiple operating systems (OS) in parallel to allow access to all hardware services from all cores 210-250.

Moreover, running the parallel operating systems (OS) in the context of individual parallel AUTOSAR stacks leads to big overhead in ROM and RAM consumption, complicates the time-, handshake- and memory-handling of parallel running drivers and applications, such as for example Ethernet drivers.

Consequently, the handling of communication between software running in parallel on the different partitions 110, 120 becomes very difficult, and can require complicated diagnostic tasks for ensuring safe and reliable operation of the overall system.

Accordingly, FIG. 1 shows Inter OS-Application Communicator (IOC) modules 510, 520 being implemented in a conventional manner for mapping communication between the partitions 110, 120. For this purpose, the Inter OS-Application Communicator (IOC) modules 510, 520 are configured and coupled to run a sender-receiver protocol, for example by implemented data memory buffers. However, as explained above, applying such an arrangement can be difficult and complicated, in particular when attempting to implement a high degree of parallelism running a high number of cores.

Figure 2:
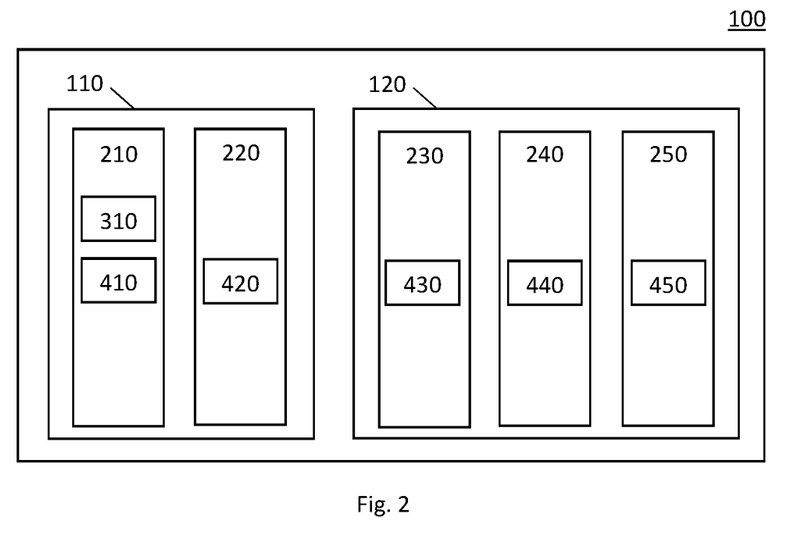

In view of this, FIG. 2 shows a different virtualization concept according to the present invention.

In this arrangement, the virtualization technique is also applied to have the electronic control unit 100 host a plurality of partitions 110, 120 for running a plurality of cores 210-250. Moreover, the first partition 110 is assigned to two cores 210, 220 and the second partition is assigned to the remaining three cores 230-250.

However, in contrast to the conventional approach shown in FIG. 1, only the first partition 110 is implemented to run an AUTOSAR architecture platform instance providing AUTOSAR basic software 310 services.

As mentioned above, the basic software 310 provides services needed by other software components 410, 420 of the first partition, for example to a software component 420 assigned to run on the second core 220 in the first partition.

In particular, the basic software 310 includes an operating system (OS) and abstraction layers for allowing easier access to services and drivers related to hardware of the electronic control unit (ECU).

Rather than duplicating the AUTOSAR architecture platform instance for the second partition 120 as shown in FIG. 1, FIG. 2 proposes a different arrangement. Here, the second partition 120 includes AUTOSAR software components 430-450 assigned to different cores 230-250 of the second partition 120, but the second partition 120 does not include any basic software modules, for example basic software modules including a separate operating system (OS).

Moreover, by implementing a partition interface to couple the first and second partitions 110, 120, the software components (SWC) of the second partition are run as part of the AUTOSAR architecture platform instance implemented in the first partition.

More specifically, the AUTOSAR software components 430-450 running on the three cores 230-250 of the second partition 120 are adapted to use the AUTOSAR basic software 310 implemented in the first partition 110.

It follows according to the present invention that an AUTOSAR stack including basic software 310 is implemented in only one of the partitions 110, but is used by AUTOSAR software 310, 410-450 of both the first and second partitions 110, 120. Thus, the conventional memory management, handshake algorithms and inter-partition communication techniques required for implementing the plurality of AUTOSAR instances in the different partitions are circumvented.

In the example of FIG. 2, the partition interface coupling the first and second partitions 110, 120 is implemented as a proxy software component (SWC) of the AUTOSAR architecture platform instance. In this way, the communication channel is restricted to AUTOSAR inherent proxy software components (SWC) providing enhanced runtime performance and testability within the AUTOSAR environment.

Figure 3:
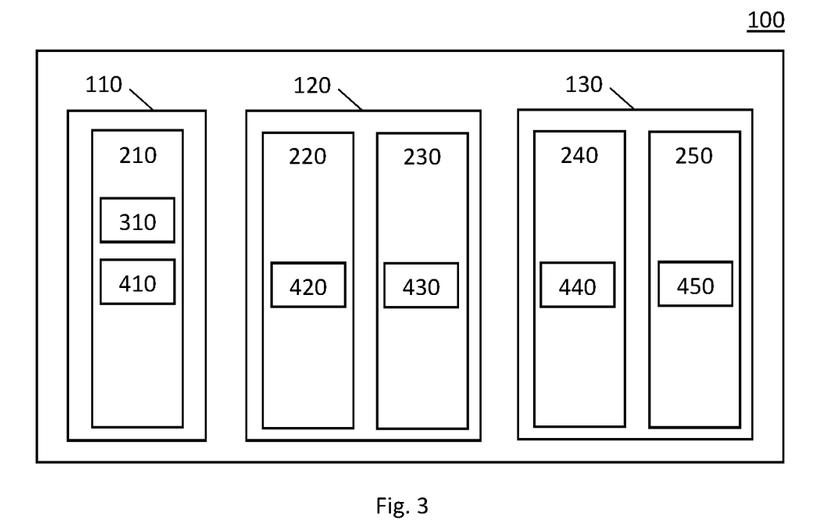

FIG. 3 shows a different arrangement according to the present invention wherein the virtualization technique is applied to have the electronic control unit 100 host three partitions 110, 120, 130 for running the plurality of cores 210-250.

In this arrangement, the first partition 110 is assigned to only one core 210, the second partition is assigned to two cores 220, 230 and a new third partition 130 is assigned to the remaining two cores 240, 250.

In addition to the partition interface coupling the first and second partitions 110, 120, the arrangement includes an additional partition interface coupling the first and third partitions. In this example, the partition interface coupling the first and second partitions 110, 120 and the partition interface coupling the first and third partitions 110, 130 are both implemented as proxy software components (SWC) of the AUTOSAR architecture platform instance. This improves the runtime performance and testability within the AUTOSAR environment.

Accordingly, AUTOSAR software components 440, 450 which are assigned to cores 240, 250 of the third partition 130 are coupled by the respective partition interface to run as part of said AUTOSAR architecture platform instance implemented in the first partition 110.

In other words, a single AUTOSAR stack is implemented in the first partition 110, and is used by AUTOSAR software of the first, second and third partitions 110, 120, 130. Thus, also in this case, the need for running in parallel the conventional plurality of AUTOSAR architecture platform instances implemented in the different partitions is circumvented, reducing the complexity and requirements of the corresponding memory management, handshake algorithms and inter-partition communication techniques.

A further advantage of implementing the AUTOSAR software components 420, 430 in the second partition 120 and the AUTOSAR software components 440, 450 in the third partition 130 is that the implementation can be performed by separately memory flashing the respective partitions 120, 130.

In this example, the flash memory addresses and address ranges of the first, second and third partitions 110, 120, 130 are fixed prior to flashing, and remain fixed between the flashing operations. Thus, the partitions 110, 120, 130 can be separately flashed based on their respective flash memory addresses and address ranges, allowing individual software development for each of the partitions 110, 120, 130, simplifying partition based memory comparisons, and allowing easier debugging/updating of software applications provided by each individual partition 110, 120, 130.

Thus, the respective partition interfaces couple the first and second partitions 110, 120 and the first and third partitions 110, 130. This arrangement is shown in FIG. 4 wherein the partition interfaces 510, 520 provide a coupling between proxy software component modules 610-640 which are implemented in the different partitions 110, 120, 130.

It follows that an AUTOSAR software component 420, 430 of the second partition 120 can communicate with an AUTOSAR software component 440, 450 of the third partition 130 by using the partition interface 510 coupling the first and second partitions 110, 120, and the partition interface 520 coupling the first and third partitions 110, 120, respectively.

Figure 4:
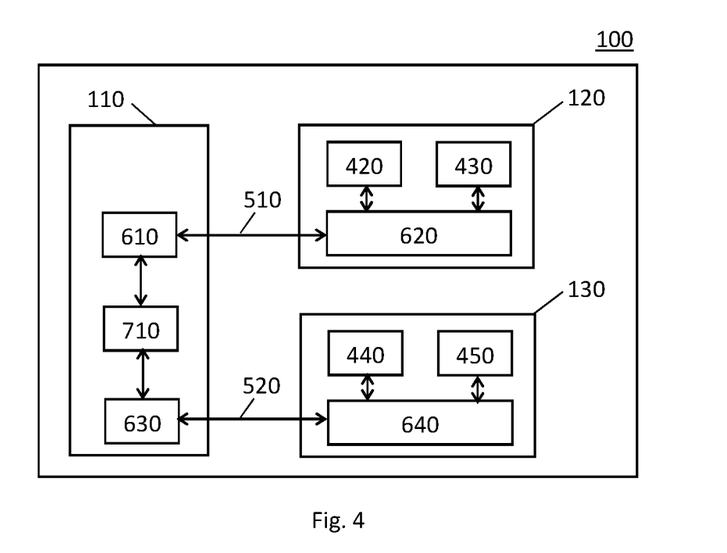

FIG. 4 shows the corresponding communication between AUTOSAR software components 420-450 of the different partitions 120, 130 being conveyed via the first partition 110 hosting the underlying operating system 710. It follows that an efficient and transparent communication scheme is provided for a multi partition system, allowing a centralized approach for improved synchronization, time scheduling and overall monitoring of data transmission within the multi core system.

This is particularly useful for collecting and distributing signals in a coordinated manner by the operating system 710 of the first partition 110, wherein signals are shown in FIG.

4 to be generated and received by AUTOSAR software components 420-450 belonging to the different partitions 120, 130 of the electronic control unit (ECU).

Another advantage is a reduced testing effort. If, for example, software of the first and third partitions 110, 130 is changed (i.e. developed further), the changed software is then flashed into the respective memory address ranges. After that a binary comparison of the software of the second partition 120 is performed to assure that the second partition has not been changed. No full test of the second partition 120 is necessary. Rather, only an interface (dynamic and static) test for the functions of the second partition 120 needs to be performed. Also, a test of the functions of the changed first and third partition 110, 130 is carried out.

Thereby, the test effort required can be greatly reduced.

LIST OF REFERENCE NUMERALS 100 electronic control unit (ECU)
110-130 partitions
210-250 cores
310-320 AUTOSAR basic software (BSW)
410-450 AUTOSAR software components (SWC)
510-520 partition interface coupling
610-640 proxy software component modules
710 operating system (OS)

The invention claimed is:

1. An electronic control unit comprising a plurality of cores, wherein:
the electronic control unit hosts a plurality of partitions including at least a first partition and a second partition;
the first partition is assigned to only one first core of said cores;
the second partition is assigned to only one second core of said cores;
the first partition is implemented to run an automotive open system architecture platform instance on the first core, the automotive open system architecture platform including an operating system configured for providing basic software services, wherein the first partition is the only one of the partitions implemented to run the automotive open system architecture platform instance providing the basic software services and wherein the first partition is the only one of the partitions which acts as a data interface for routing communications such that all data transfer between any of the plurality of partitions is routed through the first partition;
the second partition is implemented to run automotive open system architecture software components that need the basic software services provided by the first partition on the first core to fulfill respective functions of the software components; and
a partition interface couples the first and second partitions such that the software components are run as part of said automotive open system architecture platform instance implemented in the first partition.

2. The electronic control unit of claim 1, wherein the partitions include a third partition that is assigned to only one third core of said cores, the third partition is implemented to run automotive open system architecture software components, and wherein a partition interface couples the first and third partitions such that the software components of the third partition are run as part of said automotive open system architecture platform instance implemented in the first partition.

3. The electronic control unit of claim 2, wherein
the automotive open system software components of the second partition and the automotive open system software components of the third partition are implemented by separately memory flashing the respective partitions, and
flash memory addresses and address ranges of the first, second and third partitions are fixed and remain fixed between said flashing.

4. The electronic control unit according to claim 2, wherein
said partition interface coupling the first and second partitions is implemented as a proxy software component of the automotive open system architecture platform instance,
and/or
said partition interface coupling the first and third partitions is implemented as a proxy software component of the automotive open system architecture platform instance.

5. The electronic control unit according to claim 2, wherein one of the software components of the second partition communicates with one of the software components of the third partition through the first partition via said partition interfaces coupling the first and second partitions, and the first and third partitions.

6. The electronic control unit according to claim 1, wherein
the operating system is configured for scheduling and/or time monitoring execution of the software components, and
said operating system is configured to schedule and/or time monitor a software component running on the second core and/or the third core.

7. The electronic control unit of claim 6, wherein
said operating system is provided with fixed start addresses of software components running on the second core or the third core, such as to schedule execution of the respective software components.

8. The electronic control unit according to claim 1, wherein every one of the plurality of partitions is assigned to only a respective one of said cores.

9. The electronic control unit of claim 1, wherein the basic software services provided by the first partition and used by the software components of the second partition include services arranged in an automotive open system basic software: service layer, electronic control unit abstraction layer, microcontroller abstraction layer and/or complex drivers layer.

10. The electronic control unit according to claim 1, wherein there are n second partitions and a total of n+1 partitions, wherein n is an integer greater than zero.

11. A method of executing automotive open system software components, the method comprising:
hosting a plurality of partitions including a first partition and a second partition; assigning the first partition to only one first core of an electronic control unit including a plurality of cores;
implementing the first partition to run, on the first core, an automotive open system architecture platform instance including an operating system configured for providing basic software services, wherein the first partition is the only one of the partitions implemented to run the automotive open system architecture platform instance providing the basic software services;
assigning the second partition to only one second core of the cores;

implementing the second partition to run, on the second core, automotive open system architecture software components that need the basic software services provided by the first partition on the first core to fulfill respective functions of the software components;

coupling the first and second partitions such that the software components are run as part of said automotive open system architecture platform instance implemented in the first partition; and using only the first partition as a data interface for routing communications such that all data transfer between any of the plurality of partitions is routed through the first partition.

12. The method of claim 11, further comprising:

assigning a third partition to at only one third core of the cores;

changing only one of the second partition or the third partition, wherein all partition interfaces remain unchanged; and performing a binary comparison of software of the unchanged one of the second partition or the third partition to verify that the unchanged one of the second partition or the third partition has not been changed.

13. The method of claim 12, further comprising:

changing the data interface and/or a partition interface;

changing only one of the second partition or the third partition; and performing a binary comparison of the software of the unchanged one of the second partition or the third partition to verify that the unchanged one of the second partition or the third partition has not been changed.

14. The method of claim 12, further comprising performing the binary comparison and a test of the changed one of the second partition or the third partition.

15. The method of claim 11, wherein there are n second partitions and a total of n+1 partitions, wherein n is an integer greater than zero.

* * * * *